US007143975B2

(12) United States Patent
Udall

(10) Patent No.: US 7,143,975 B2
(45) Date of Patent: Dec. 5, 2006

(54) LANDING ARRANGEMENT FOR AN AIRCRAFT

(75) Inventor: Kenneth F Udall, Derby (GB)

(73) Assignee: Rolls-Royce plc, London (GB)

( * ) Notice: Subject to any disclaimer, the term of this patent is extended or adjusted under 35 U.S.C. 154(b) by 40 days.

(21) Appl. No.: 11/028,535

(22) Filed: Jan. 5, 2005

(65) Prior Publication Data

US 2005/0218263 A1    Oct. 6, 2005

(30) Foreign Application Priority Data

Feb. 7, 2004   (GB) ................................. 0402705.8

(51) Int. Cl.
*B64C 25/10*    (2006.01)
(52) U.S. Cl. ............................. 244/102 R; 244/100 R; 244/102 SL; 244/103 R; 244/118.3; 244/115; 244/1 R
(58) Field of Classification Search ............ 244/102 R, 244/110 E, 100 R, 102 SL, 103 R, 118.3, 244/115, 1 R
See application file for complete search history.

(56) References Cited

U.S. PATENT DOCUMENTS

| 1,971,613 | A | * | 8/1934 | Kindelberger | ............... 244/109 |
| 2,015,920 | A | * | 10/1935 | Canney | ................... 244/102 R |
| 2,081,437 | A | * | 5/1937 | Martin | ........................ 244/13 |
| 2,270,042 | A | * | 1/1942 | Ferris | ......................... 244/115 |
| 2,346,010 | A | * | 4/1944 | Cowey | ................... 244/100 R |
| 2,384,706 | A | * | 9/1945 | Sullwold | ..................... 244/111 |
| 2,448,064 | A | * | 8/1948 | Wallace | .................. 244/102 R |
| 2,511,362 | A | * | 6/1950 | Mercier | ...................... 244/202 |
| 2,565,007 | A | * | 8/1951 | Van Zelm et al. | ...... 244/102 R |
| 2,630,989 | A | * | 3/1953 | Sikorsky | ................. 244/102 R |
| 2,690,887 | A | * | 10/1954 | Perdue | ................... 244/102 R |
| 2,882,070 | A | * | 4/1959 | Bill | ............................ 280/475 |
| 3,275,270 | A | * | 9/1966 | Desmond et al. | ........ 244/110 E |
| 3,335,981 | A | * | 8/1967 | Pauli et al. | ............. 244/102 R |
| 3,826,450 | A | | 7/1974 | Currey | |
| 3,954,232 | A | * | 5/1976 | Harper | .................... 244/102 R |
| 4,228,975 | A | * | 10/1980 | Sealey | ..................... 244/102 R |
| 4,235,399 | A | * | 11/1980 | Shorey | ..................... 244/137.1 |
| 2006/0032981 | A1 | * | 2/2006 | Fort | ........................ 244/129.4 |

FOREIGN PATENT DOCUMENTS

| GB | 0 559 229 | 2/1944 |
| GB | 1 024 455 | 3/1966 |
| GB | 1 028 669 | 5/1966 |

OTHER PUBLICATIONS http://en.wikipedia.org/wiki/Mitsubishi_3000GT (first available on the internet Jan. 7, 2004).*
The American Heritage Dictionary of the English Language, Houghton Mifflin, 2003.*

* cited by examiner

*Primary Examiner*—Teri Pham Luu
*Assistant Examiner*—Edward J. Mayle
(74) *Attorney, Agent, or Firm*—W. Warren Taltavull; Manelli Denison & Selter PLLC

(57) ABSTRACT

A landing arrangement for an aircraft comprises an aircraft support assembly (22) to support the aircraft (10) when the aircraft is on the ground. The aircraft support assembly (2) is movable between a first ground engaging condition (22b) in which the aircraft nose (24) is spaced above the ground by a first distance (X) and a second ground engaging condition (22C) in which the aircraft nose (24) is spaced above the ground by a second distance (Y). The second distance (Y) is less than the first distance (X).

14 Claims, 5 Drawing Sheets

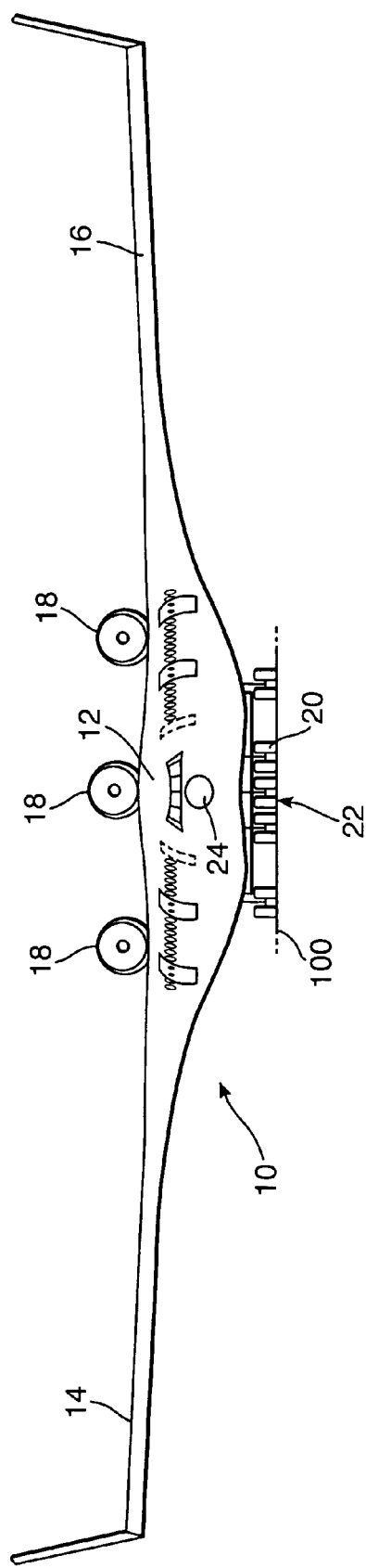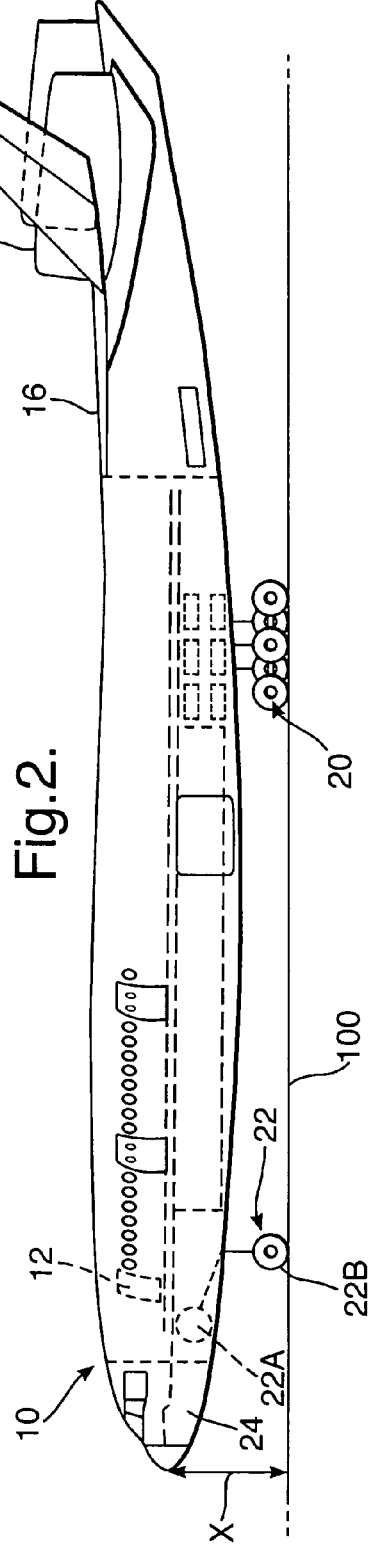

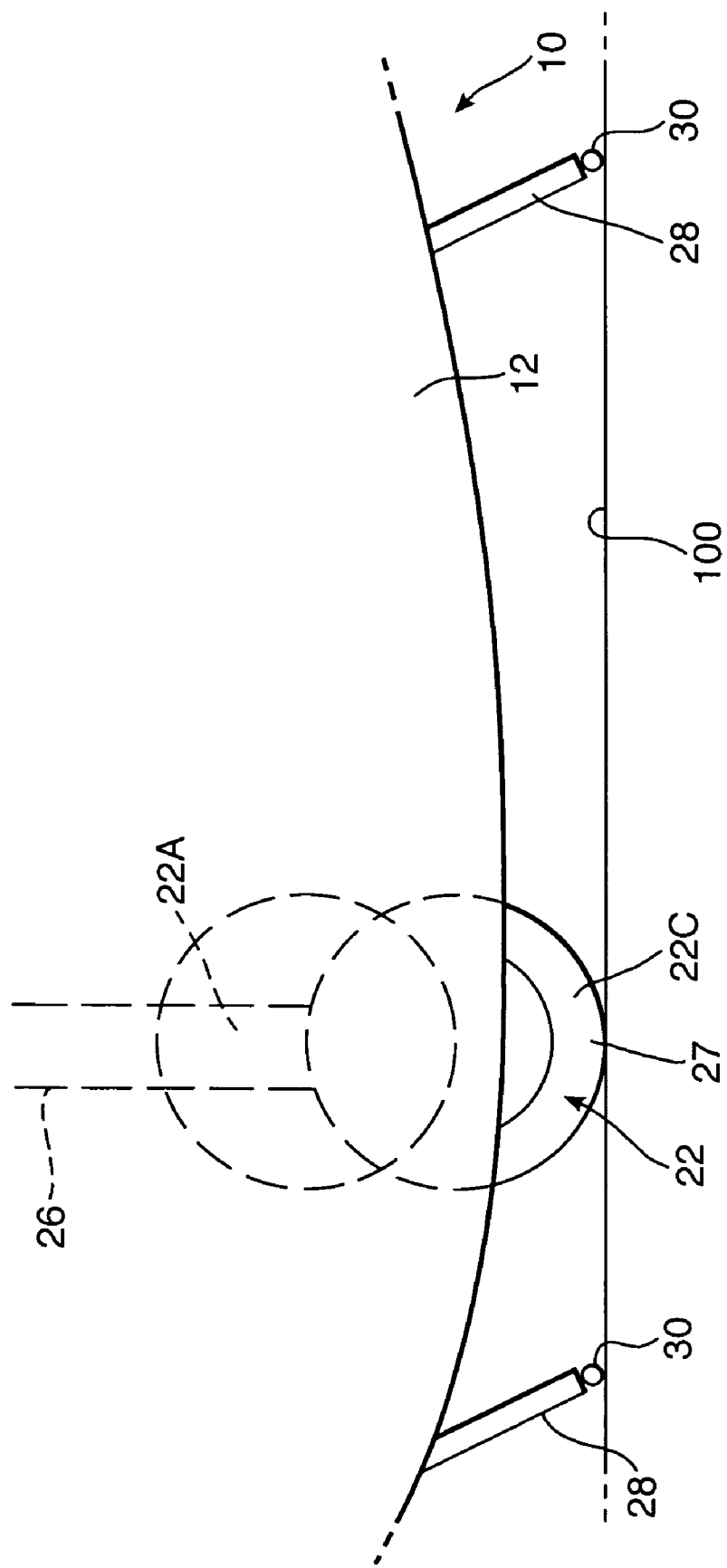

LANDING ARRANGEMENT FOR AN AIRCRAFT

FIELD OF THE INVENTION

This invention relates to landing arrangements for aircraft. More particularly but not exclusively, the invention relates to landing arrangements incorporating nose wheels for aircraft. The invention also relates to methods of operating landing arrangements for aircraft.

BACKGROUND OF THE INVENTION

In the blended wing body aircraft, the engines are positioned above the wing to the rear of the aircraft. When the aircraft lands, the engines are operated in reverse thrust mode to rapidly decelerate the aircraft. However, the reverse thrust load line is high above the centre of gravity of the aircraft and on the application of reverse thrust the force produced thereby may tend to rotate the aircraft about the main landing gear and lift the nose wheel off the runway.

SUMMARY OF THE INVENTION

According to one aspect of this invention, there is provided a landing arrangement for an aircraft, the arrangement comprising an aircraft support assembly to support the aircraft when the aircraft is on the ground, wherein the aircraft support assembly is movable between a first ground engaging condition, in which the aircraft nose is spaced above the ground by a first distance and a second ground engaging condition in which the aircraft nose is spaced above the ground by a second distance, the second distance being less than the first distance and a spoiler arrangement is provided adjacent to the aircraft support assembly, said spoiler arrangement being movable from a retracted condition to an extended condition when the support assembly is in the second ground engaging condition.

According to another aspect of this invention, there is provided a method of operating a landing arrangement for aircraft, a landing arrangement comprising a support assembly to support the aircraft when the aircraft is on the ground, the method comprising moving the landing arrangement to a first ground engaging condition when the aircraft initially lands, wherein the nose of the aircraft is spaced a first distance from the ground, and thereafter moving the landing arrangement to a second ground engaging condition, wherein the nose of the aircraft is spaced a second distance from the ground, the second distance being less than the first distance and deploying a spoiler arrangement adjacent to the aircraft support assembly, said spoiler arrangement being deployed from a non-extended position to an extended position when the support assembly is in the second ground engaging condition.

Preferably, the spoiler arrangement inhibits or prevents the flow of air underneath the aircraft and enhances the downward force on the nose from the airflow across the aircraft.

The spoiler arrangement may comprise at least one flap, which may be movable between the extended and non-extended positions. Each flap may be provided with roller elements to support the aircraft. Preferably the roller elements comprise wheels.

Preferably, the second distance is such that when the landing arrangement is in the second ground engaging condition, the downward load on the body of the aircraft is greater than the downward load on the body of the aircraft when the landing arrangement is in the first ground engaging condition.

The aircraft support assembly may be pivotally movable between the first and second ground engaging conditions. The aircraft support assembly may comprise front landing gear of the aircraft.

Preferably, the aircraft support assembly is movable to and from a stored condition in addition to the first and second ground engaging conditions. The aircraft support assembly may be movable between the stored condition, the first ground engaging condition and the second ground engaging condition. Preferably, the aircraft support assembly is pivotally movable between the stored conditions, the first ground engaging condition and the second ground engaging condition. When the aircraft support assembly is in the stored condition, the aircraft support assembly may be stored within the body of the aircraft.

The aircraft support assembly may comprise roller means and a carrier assembly carrying the roller means. The carrier assembly may be movable to allow the support assembly to move between the stored condition, and the first and second ground engaging conditions. Preferably, the carrier assembly is pivotally movable between the aforesaid conditions. Preferably, the roller means comprises at least one wheel. In the preferred embodiment, the aircraft support arrangement may comprise front landing gear. When the aircraft support assembly is in the stored condition, the aircraft support assembly may be stored within the body of the aircraft.

According to another aspect of this invention, there is provided an aircraft incorporating an aircraft support arrangement as described above.

Preferably, the aircraft has engines arranged above the centre of gravity of the aircraft. Preferably, the aircraft has a main body and the engines are arranged above a centre line through the main body.

BRIEF DESCRIPTION OF THE DRAWINGS

An embodiment of the invention will now be described by way of example only, with reference to the accompanying drawings, in which:

FIG. 1 shows a front view of an aircraft;

FIG. 2 shows a side view of an aircraft with the aircraft support assembly of the landing arrangement in a first ground engaging condition;

FIG. 4 is a close up view of the region marked IV in FIG. 3; and

DETAILED DESCRIPTION OF THE INVENTION

Figure 3:
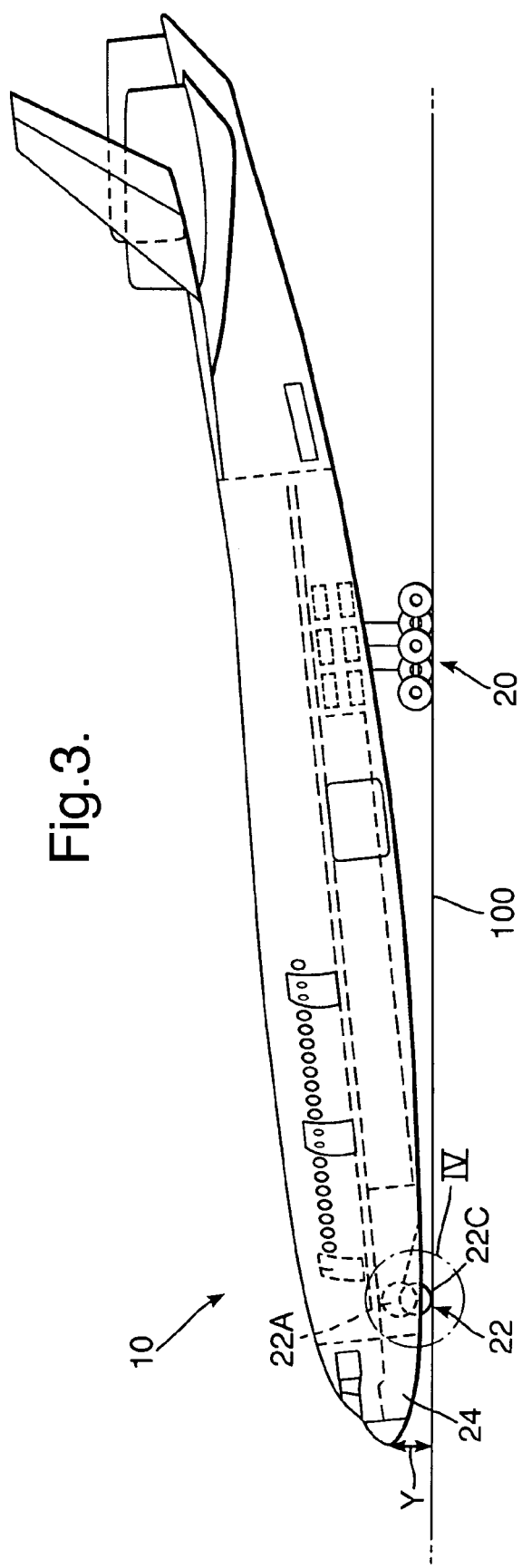
FIG. 3 is a view similar to the view shown in FIG. 2 with the aircraft support assembly in a second ground engaging condition.

Referring to FIGS. 1 the drawings, there is shown an aircraft 10, generally known as a blended wing body aircraft. Although, as suggested by the name of the aircraft the body and the wings of the aircraft 10 are merged to form a single structure, it can be seen generally that the aircraft 10 comprises the following features, namely a body 12, wings 14, 16 and engines 18. The aircraft also includes landing arrangement in the form of a main landing gear 20 arranged just rearward of the centre of the body 12 and an aircraft support assembly in the form of a front landing gear 22, arranged in the vicinity of the nose 24 of the body 12. Referring to FIG. 4 it can be seen that the front landing gear 22 comprise a carrier 26 pivotally mounted to the body 12 of the aircraft 10, and one or more wheels 27 rotatably carried by the carrier 26. The carrier 26 is shown in more detail in FIGS. 5A to 5C.

When the aircraft 10 is about to land, the main landing gear 20 and the front landing gear 22 are moved from respective stored conditions to ground engaging conditions, shown in FIG. 2. Specifically, the front landing gear 22 is moved from a stored condition 22A, shown in broken lines in FIG. 2, in which the front landing gear is stored within the body of the aircraft, to a first ground engaging condition 22B, shown in solid lines in FIG. 2, in which the front landing gear is fully extended, also as shown in FIG. 2.

After the aircraft 10 touches down on the runway 100, the front landing gear 22 supports the nose 24 of the aircraft a first distance X above the ground. After the aircraft 10 has touched down it is necessary to rapidly retard or decelerate the aircraft 10 in order to bring it to a halt. This is achieved by shifting the engines 18 into reverse thrust mode, as would be understood by any person skilled in the art.

In view of the fact that the engines 18 are arranged above the centre line of the body 12, there is a risk that the reverse thrust could lift the front landing gear 22 off the runway. In order to avoid this, the front landing gear 22 is pivotally moved to a second ground engaging condition 22C, as shown in FIG. 3.

In this second ground engaging condition 22C, the nose 24 of the aircraft 10 is supported a second distance Y above the runway 100. The second distance Y is less than the first distance X. Thus, during the reverse thrust of the engines 18, the nose 24 of the aircraft 10 is closer to the runway 100, than just after landing, as shown in FIG. 2.

Moving the nose 24 of the aircraft 10 to the second ground engaging condition shown in FIG. 3 has the effect of, firstly increasing the downward load on the front landing gear 22 by virtue of the ground effect created by the airflow underneath the main body of the aircraft 10, as explained below. The downward load on the front landing gear 22 is also increased by the effect of the movement of the centre of gravity of the aircraft 10 towards the runway 100. This latter effect is a minor effect. The major effect on the downward load on the front landing gear is by the ground effect.

The ground effect created by the airflow underneath the aircraft has the outcome of increasing the downward force on the nose 24. Whilst not wishing to be limited to any particular theory, it is believed that the ground effect is created by a volume of air being captured beneath the aircraft as the nose 24 of the aircraft 10 is lowered to the position shown in FIG. 3. This cushion has a small cross-sectional area at the front of the aircraft 10, which tapers to a larger cross-sectional area towards the rear of the aircraft 10. As the aircraft 10 moves forward, a partial vacuum is created beneath the aircraft. As a result the pressure, and hence the downward force, of the air above the aircraft 10 is greater than the pressure, and the upward force, of the air below the aircraft 10. Thus, there is a net downward force on the aircraft 10 preventing the nose 24 from lifting during reverse thrust of the engines 18.

In order to enhance this ground effect, as soon as the front landing gear 22 is moved to the second ground engaging condition 22C, spoiler flaps 28 provided on the underside of the body 12, can be extended downwardly, as shown in FIG. 3. In addition to enhancing the ground effect of the flow of air under the nose 24 of the aircraft, the spoiler flaps 28 also have the effect of increasing the drag of the air flowing underneath the aircraft and thereby enhancing deceleration.

The spoiler flaps are provided to seal the gaps between the underside of the forward fuselage of the aircraft 10 and the runway 100, thereby prevents or inhibiting the flow of air underneath the aircraft. The flaps 28 may be provided with flap wheels 30 to support the nose 24 of the aircraft 10 in the event of a burst tire on the nose wheel 27. The flap wheels may be sacrificial, designed to be worn away in the event of supporting the aircraft 10.

Figure 5A:
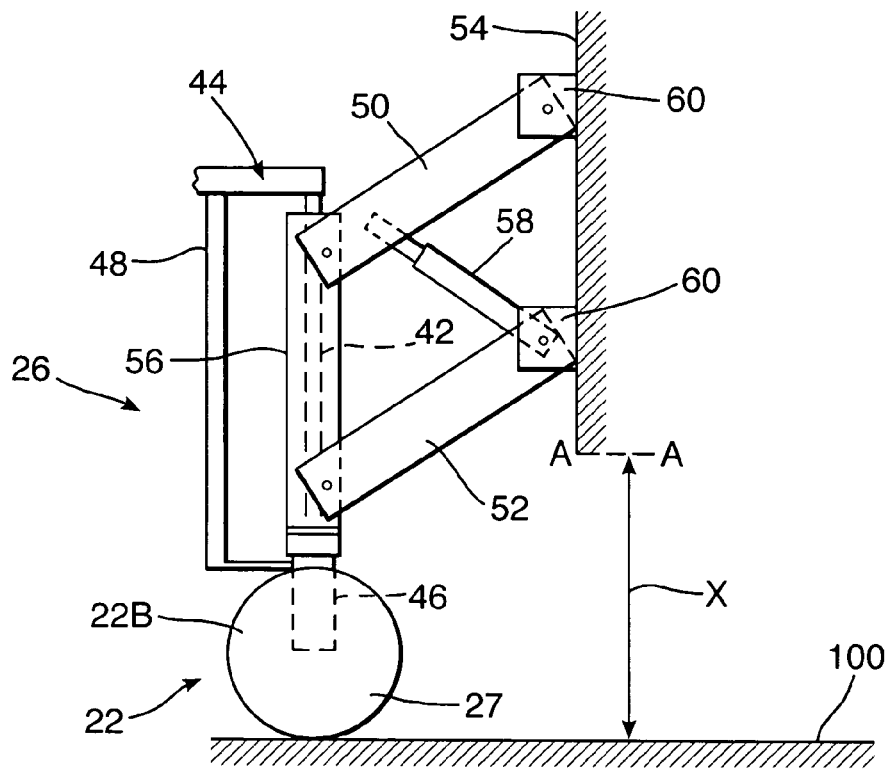
FIGS. 5A to 5C are diagrammatic side views of three positions of the front landing gear of the aircraft shown in FIG. 4.
Figure 5B:
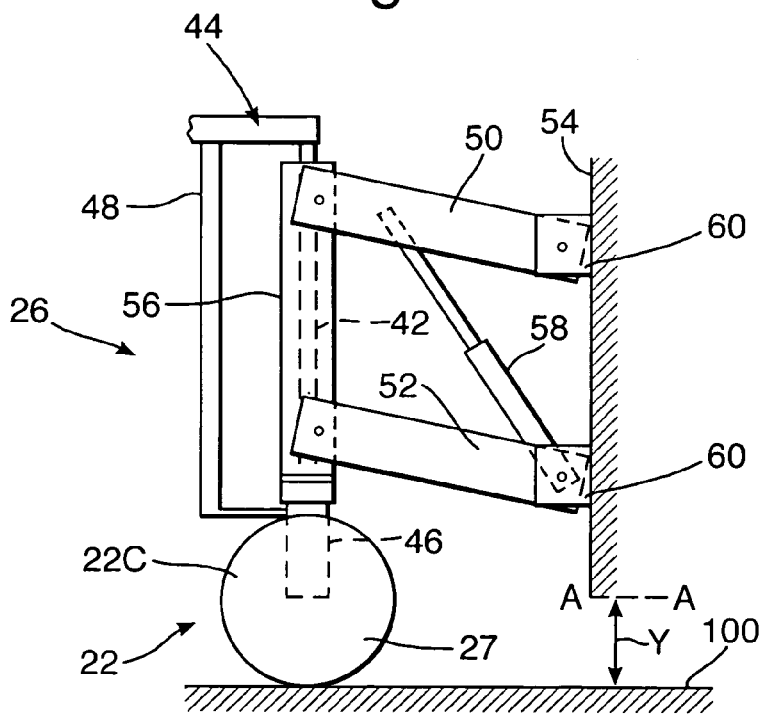
Figure 5C:
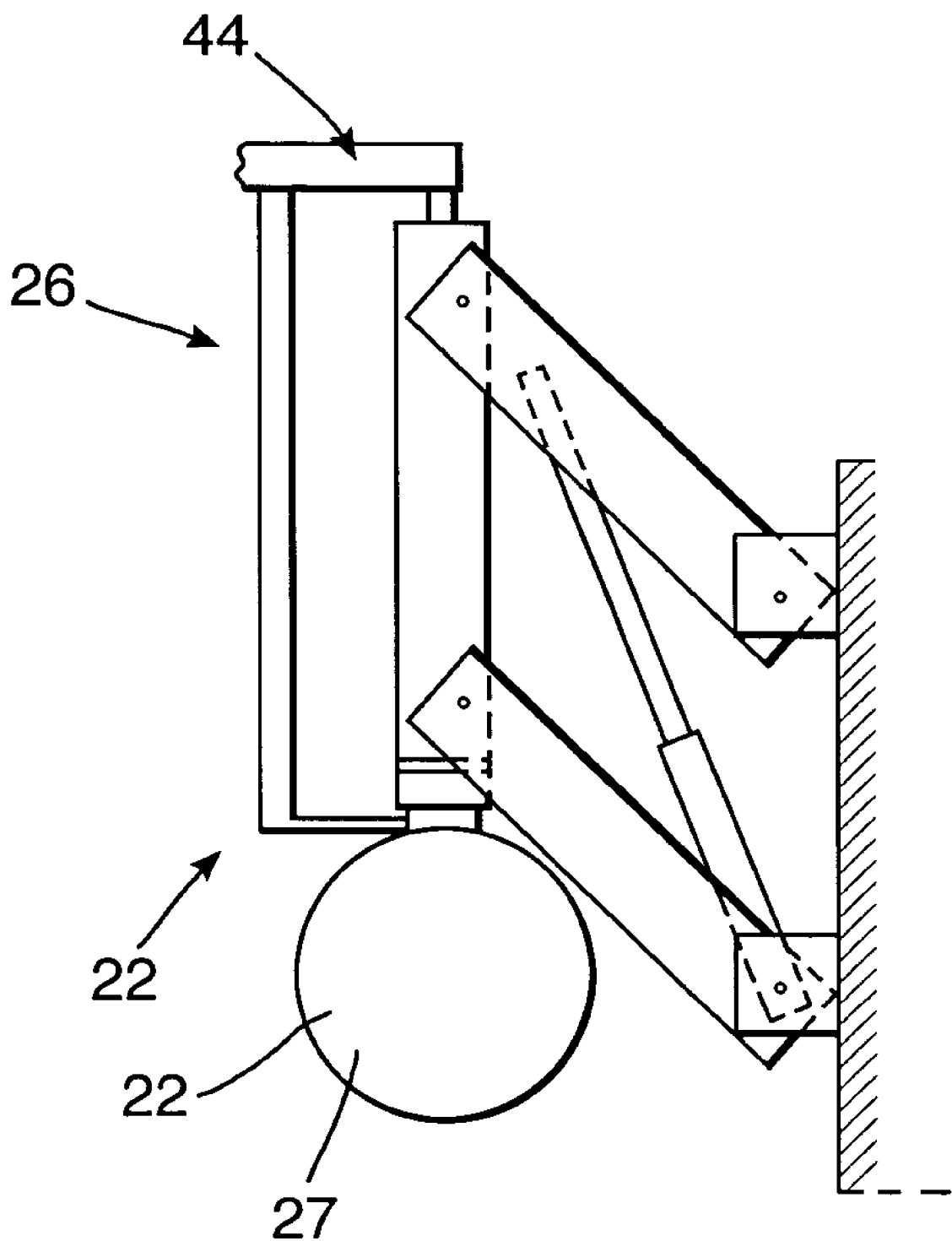

FIGS. 5A to 5C show the front landing gear 22 in respective first and second ground engaging conditions 22B and 22C (FIGS. 5A and 5C) and stored condition 22A (FIG. 5C).

The front landing gear 22 comprises the nose wheel or wheels 27 and the carrier 26. The carrier 26 comprises a steering arrangement comprising a steering member 42 and a steering link 44, the steering link 44 being provided to connect the steering member 42 to the cabin of the aircraft, in a way known in the art.

The steering member 42 extends generally vertically from the steering link 44 to a wheel mounting arrangement 46 upon which the wheel 27 is rotatably mounted. A generally L-shaped stabilising member 48 also extends from the steering link 44 to the wheel mounting arrangement 46. The raising and lowering of the landing gear 22 is effected by a pair of parallel levers 50, 52 extending between a fixed support 54 mounted on the aircraft and a vertical frame member 56 through, or along, which the steering member 42 extends.

The levers 50, 52 are pivotally mounted at one end to the fixed support 54 by upper and lower lugs 60, and extend parallel to each other to the vertical frame member 56 to which the opposite ends of the levers 50,52 are pivotally mounted.

Power means in the form of a hydraulic ram 58 extends between the lower of the lugs 60 and the upper lever 50. Operation of the hydraulic ram 58 moves the landing gear between the first and second ground engaging positions 22B, 22C shown in FIGS. 5A and 5B respectively and the stored condition 22A shown in FIG. 5C.

FIG. 5A shows the landing gear 27 in the first ground engaging condition in which the wheel 27 is fully lowered. The line A—A represents the position of the belly of the aircraft 10. As can be seen the line A—A of the aircraft 10 is spaced by a distance X from the runway 100. This is the position of the aircraft 10 when it first touches down on the runway 10.

In order to increase the download on the aircraft 10, it is explained above, necessary to lower the nose of the aircraft 10 to enable the above described ground effect to operate. The hydraulic ram 58 causes the levels 50, 52 to move to the position shown in FIG. 5B, thereby lowering the nose of the aircraft 10 so that the line A—A is moved to a distance Y from the runway 100. As can be seen the distance Y is significantly less than the distance X. The distance Y is calculated to be such as to cause the above described ground effect to operate.

FIG. 5C shows the landing gear 22 in the stored position 22A, adopted by the landing gear when the aircraft 10 is flying. The landing gear 22 is moved to the condition 22A by further action of the hydraulic ram 58 on the lever 50 causing further pivoting of the levers 50, 52 to the position shown in FIG. 5C.

There is thus described a preferred embodiment of a landing arrangement for an aircraft, more particularly a blended wing bodied aircraft, which has the advantage that it prevents the nose of the aircraft being lifted off the ground when landing when the engines are in reverse thrust mode during deceleration.

I claim:

1. A landing arrangement for an aircraft, the landing arrangement comprising an aircraft support assembly to support the aircraft when the aircraft is on the ground, wherein the aircraft support assembly is movable between a first ground engaging condition, in which the aircraft nose is spaced above the ground by a first distance, and a second ground engaging condition, in which the aircraft nose is spaced above the ground by a second distance, the second distance being less than the first distance and a spoiler arrangement is provided adjacent to the aircraft support assembly, said spoiler arrangement being moveable from a retracted condition to an extended condition when the support assembly is in the second ground engaging condition wherein the spoiler arrangement comprises at least one flap, said flap being movable between the said extended and non-extended positions and wherein the at least one flap is provided with roller elements to support the aircraft.

2. A landing arrangement according to claim 1 wherein the spoiler arrangement inhibits or prevents the flow of air underneath the aircraft and enhances the downward force on the nose from the airflow across the top of the aircraft.

3. A landing arrangement for an aircraft, the landing arrangement comprising an aircraft support assembly to support the aircraft when the aircraft is on the ground, wherein the aircraft support assembly is movable between a first ground engaging condition, in which the aircraft nose is spaced above the ground by a first distance, and a second ground engaging condition, in which the aircraft nose is spaced above the ground by a second distance, the second distance being less than the first distance and a spoiler arrangement is provided adjacent to the aircraft support assembly, said spoiler arrangement being moveable from a retracted condition to an extended condition when the support assembly is in the second ground engaging condition wherein the spoiler arrangement comprises at least one flap, said flap being movable between the said extended and non-extended positions and wherein the at least one flap is provided with wheels to support the aircraft.

4. A landing arrangement for an aircraft according to claim 1 wherein the aircraft support assembly is pivotally movable between the first and second ground engaging conditions.

5. A landing arrangement according to claim 1 wherein the aircraft support assembly is movable to and from a stored condition in addition to the first and second ground engaging conditions.

6. A landing arrangement according to claim 1 wherein, the aircraft support assembly is pivotally movable between a stored condition, the first ground engaging condition and the second ground engaging condition.

7. A landing arrangement according to claim 1 wherein the aircraft support assembly comprises said roller elements and a carrier assembly carrying the said roller elements, the carrier assembly being movable to allow the support assembly to move between a stored condition, and the first and second ground engaging positions.

8. An aircraft incorporating an aircraft support assembly as claimed in claim 1 in wherein the aircraft has engines arranged above the centre of gravity of the aircraft.

9. A method of operating a landing arrangement for an aircraft, wherein the landing arrangement comprises a support assembly to support the aircraft when the aircraft is on the ground, the method comprising moving the landing arrangement to a first ground engaging condition to support the aircraft when the aircraft initially lands, wherein the nose of the aircraft is spaced a first distance from the ground, and thereafter moving the landing arrangement to a second ground engaging condition, wherein the nose of the aircraft is spaced a second distance from the ground, the second distance being less than the first distance and deploying a spoiler arrangement adjacent to the aircraft support assembly, said spoiler arrangement being deployed from a non-extended position to an extended position when the support assembly is in the second ground engaging condition wherein the spoiler arrangement comprises at least one flap, said flap being movable between the extended and non-extended positions and each flap is provided with roller elements to support the aircraft.

10. A method according to claim 9 wherein the spoiler arrangement inhibits or prevents the flow of air underneath the aircraft when the spoiler arrangement is in the extended position, thereby enhancing the downward force of the aircraft from the airflow across the aircraft.

11. A method according to claim 9 wherein the second ground engaging condition is such that the downward load on the body of the aircraft when the landing arrangement is in the second ground engaging condition is greater than the downward load on the body of the aircraft when the landing arrangement is in the first ground engaging condition.

12. A method according to claim 9 comprising pivotally moving the aircraft support assembly between the first and second ground engaging conditions.

13. A method according to claim 9 comprising moving the aircraft support assembly to and from a stored condition when the aircraft is flying.

14. A method according to claim 9 comprising pivotally moving the aircraft support assembly to and from a stored condition.

* * * * *